(12) United States Patent
Hsu et al.

(10) Patent No.: US 11,720,152 B2
(45) Date of Patent: Aug. 8, 2023

(54) HINGE WITH DOUBLE SYNCHRONOUSLY ROTATABLE AXLES

(71) Applicant: FOSITEK CORPORATION, New Taipei (TW)

(72) Inventors: An-Szu Hsu, New Taipei (TW); Way-Han Dai, New Taipei (TW); Tzu-Hao Lin, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 186 days.

(21) Appl. No.: 17/385,344

(22) Filed: Jul. 26, 2021

(65) Prior Publication Data

US 2022/0365569 A1    Nov. 17, 2022

(30) Foreign Application Priority Data

May 17, 2021  (TW) ................................ 110117724

(51) Int. Cl.
  *G06F 1/16*     (2006.01)
  *F16C 11/04*    (2006.01)
  *E05D 3/12*     (2006.01)

(52) U.S. Cl.
  CPC ............ *G06F 1/1681* (2013.01); *F16C 11/04* (2013.01); *E05D 3/122* (2013.01); *E05Y 2900/606* (2013.01); *G06F 1/1652* (2013.01)

(58) Field of Classification Search
  CPC ...... F61F 1/1681; F61F 1/1616; F61F 1/1652; E05D 3/122; E05D 3/18; E05Y 2201/11; E05Y 2900/606; H04M 1/022; F16C 11/04

See application file for complete search history.

(56) References Cited

U.S. PATENT DOCUMENTS

| | | | | |
|---|---|---|---|---|
| 10,303,223 B2 * | 5/2019 | Park | ..................... | E05D 3/122 |
| 10,352,354 B1 * | 7/2019 | Hsu | ..................... | G06F 1/1641 |
| 10,401,917 B1 * | 9/2019 | Dai | ..................... | H04M 1/022 |
| 10,480,225 B1 * | 11/2019 | Hsu | ..................... | E05D 3/12 |
| 10,545,541 B1 * | 1/2020 | Dighde | ............... | F16M 11/06 |
| 10,824,197 B1 * | 11/2020 | Hsu | ..................... | G06F 1/1641 |
| 10,845,850 B1 * | 11/2020 | Kang | ................ | H04M 1/0268 |
| 11,016,541 B2 * | 5/2021 | Lin | ..................... | E05D 3/122 |
| 11,194,366 B2 * | 12/2021 | Cheng | ............... | G06F 1/1652 |
| 11,301,006 B2 * | 4/2022 | Hsu | ..................... | G06F 1/1641 |

(Continued)

*Primary Examiner* — Victor D Batson
*Assistant Examiner* — Matthew J Sullivan
(74) *Attorney, Agent, or Firm* — Burris Law, PLLC (57) ABSTRACT

A hinge includes two rotatable axle units each having two hinge shafts, two synchronizing units each disposed to make synchronous rotations of the hinge shafts, two movable bracket units each having a turnable base plate, two rotary blocks non-rotatably sleeved on the hinge shafts, and two movable plates movable relative to the rotary blocks, and two guiding bracket units, each having male and female arms respectively connected with two movable plates, and a plurality of guiding connecting members interposed between the arms. Each guiding connecting member has a protrusion and a sliding groove, and is angularly movable with the rotations of the hinge shafts. Removal of the protrusion from the sliding groove of an adjacent guiding connecting member is prevented by means of engagement of an abutting portion of the protrusion with an abutted block in the groove.

10 Claims, 11 Drawing Sheets

(56) References Cited

U.S. PATENT DOCUMENTS

| | | | | |
|---|---|---|---|---|
| 11,353,931 B2* | 6/2022 | Hsu | ............... | G06F 1/1681 |
| 11,359,425 B2* | 6/2022 | Chang | ............... | G06F 1/1681 |
| 11,447,992 B2* | 9/2022 | Wang | ............... | G06F 1/1681 |
| 11,459,809 B1* | 10/2022 | Hsu | ............... | E05D 3/122 |
| 2020/0291702 A1* | 9/2020 | Hsu | ............... | G06F 1/1681 |
| 2020/0293094 A1* | 9/2020 | Liu | ............... | G06F 1/1681 |
| 2021/0165466 A1* | 6/2021 | Kang | ............... | G06F 1/1681 |
| 2021/0195775 A1* | 6/2021 | Zhao | ............... | E05D 3/122 |
| 2021/0207648 A1* | 7/2021 | Chen | ............... | H05K 5/0226 |
| 2021/0267076 A1* | 8/2021 | Zhang | ............... | H04M 1/0216 |
| 2021/0325937 A1* | 10/2021 | Siddiqui | ............... | G06F 1/1679 |
| 2022/0011827 A1* | 1/2022 | Kim | ............... | G06F 1/1681 |
| 2022/0100238 A1* | 3/2022 | Siddiqui | ............... | G06F 1/1681 |
| 2022/0100239 A1* | 3/2022 | Siddiqui | ............... | G06F 1/1618 |
| 2022/0120124 A1* | 4/2022 | Quynh | ............... | F16C 11/04 |
| 2022/0159109 A1* | 5/2022 | Kang | ............... | H04M 1/022 |
| 2022/0179459 A1* | 6/2022 | Wang | ............... | F16C 11/045 |
| 2022/0206543 A1* | 6/2022 | Kim | ............... | G06F 1/1616 |
| 2022/0206544 A1* | 6/2022 | Park | ............... | E05D 3/122 |
| 2022/0210937 A1* | 6/2022 | Yun | ............... | H05K 5/0017 |
| 2022/0256721 A1* | 8/2022 | Lin | ............... | H05K 5/0226 |
| 2022/0365570 A1* | 11/2022 | Hsu | ............... | G06F 1/1681 |

* cited by examiner

HINGE WITH DOUBLE SYNCHRONOUSLY ROTATABLE AXLES

CROSS-REFERENCE TO RELATED APPLICATION

This application claims priority of Taiwanese Patent Application No. 110117724, filed on May 17, 2021.

FIELD

The disclosure relates to a hinge for a foldable electronic device, and more particularly to a hinge with two synchronously rotatable axles.

BACKGROUND

In recent years, flexible displays have been widely used for a variety of foldable electronic devices. These flexible displays have an infolding structure and an outfolding structure. In the outfolding structure, the hinge has a base seat, two rotatable axles, two rotary blocks pivotable relative to the base seat with rotations of the rotatable axles, and a movable plate movable relative to the rotary blocks to be proximate to or distal from the base seat. However, during the rotations the rotary axles, the movable plate, when moved, is liable to be removed from the rotary blocks due to improper operation by the user and damage to the structure of the hinge.

SUMMARY

Therefore, an object of the disclosure is to provide a hinge that can alleviate at least one of the drawbacks of the prior art.

According to the disclosure, the hinge includes a base frame unit, two rotatable axle units, two synchronizing units, two movable bracket units and two guiding bracket units. The base frame unit includes a base seat which is elongated in a front-rear direction. The rotatable axle units are disposed on the base seat and are spaced apart from each other in the front-rear direction. Each of the rotatable axle units includes a receiving seat which is disposed on the base seat, and two hinge shafts which are spaced apart from each other in a left-right direction that is transverse to the front-rear direction and each of which is rotatably disposed to the receiving seat about a shaft axis parallel to the front-rear direction. The synchronizing units are respectively disposed to the rotatable axle units to make synchronous rotations of the hinge shafts in opposite rotational directions. The movable bracket units are pivotably disposed to the base seat and opposite to each other in the left-right direction. Each of the movable bracket units includes a base plate which is turnably disposed to the base frame unit and which is elongated in the front-rear direction, two rotary blocks which are non-rotatably sleeved on the hinge shafts, respectively, and two movable plates which are connected with and movable relative to the rotary blocks, respectively, and each of which has a distal end remote from the respective hinge shaft. The guiding bracket units are respectively disposed on front and rear ends of the base seat. Each of the guiding bracket units includes a male arm which is securely connected with one of the movable plates of one of the movable bracket units, a female arm which is securely connected with one of the movable plates of the other one of the movable bracket units and opposite to the male arm in the left-right direction, and a plurality of guiding connecting members which are interposed between the male arm and the female arm and which are adjoined with each other in the left-right direction. Each of the guiding connecting members has a body which extends in the left-right direction to have first and second end surfaces and which has a sliding groove that extends from the second end surface toward the first end surface, and a protrusion which extends outwardly from the first end surface and which is movably engaged in the sliding groove of an adjacent one of the guiding connecting members. Each of the guiding connecting members is angularly movable relative to the base seat between a first position, where the protrusion is fully engaged in the corresponding sliding groove so as to permit the guiding connecting members to be close intimately to each other, the male and female arms extend in an up-down direction that is transverse to both the front-rear direction and the left-right direction, and the movable plates extend also in the up-down direction and proximate to the corresponding hinge shafts to have the distal ends close to each other, and a second position, where the protrusion is partly engaged in the corresponding sliding groove so as to permit the guiding connecting members to be remote from each other, the male and female arms extend in the left-right direction, and the movable plates also extend in the left-right direction to have the distal ends remote from each other, and are moved relative to the rotary blocks to be distal from the corresponding hinge shafts. The body of each of the guiding connecting members has an abutted block which is formed in the sliding groove. The protrusion has an abutting portion which faces and abuts against the abutted block of the adjacent guiding connecting member in the second position to prevent removal of the protrusion from the sliding groove.

During the angular movement of the guiding connecting members between the first position and the second position, removal of the protrusions from the corresponding sliding grooves is prevented by means of abutting engagement of the abutting portions of the protrusions against the abutted blocks in the sliding grooves. Also the male arm and the female arm are securely connected with the movable plates so as to prevent excess movement of the movable plates away from the hinge shafts and removal of the movable plates from the rotary blocks.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
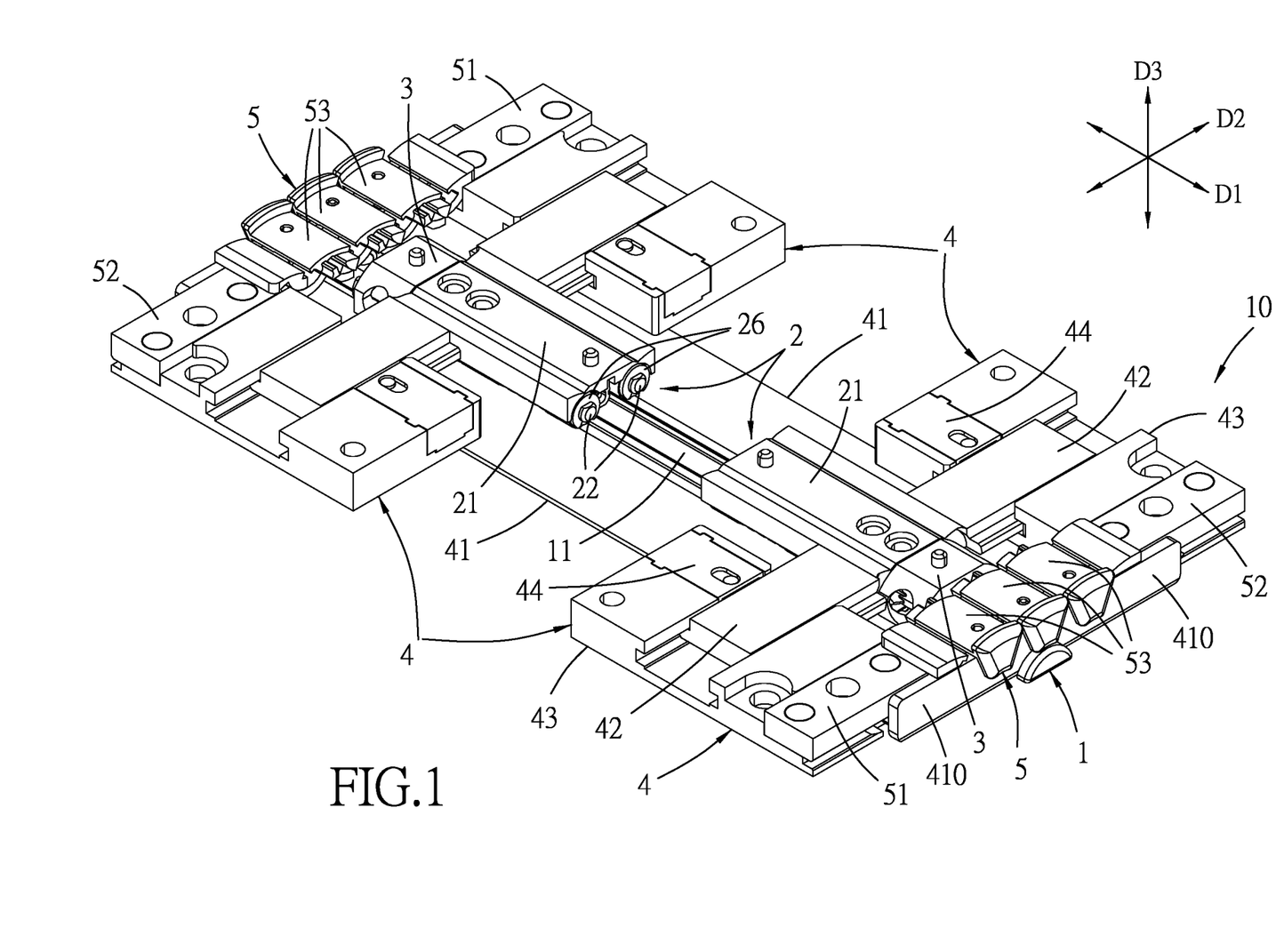
FIG. 1 is a perspective view illustrating an embodiment of a hinge according to the disclosure in an unfolded state.
Figure 2:
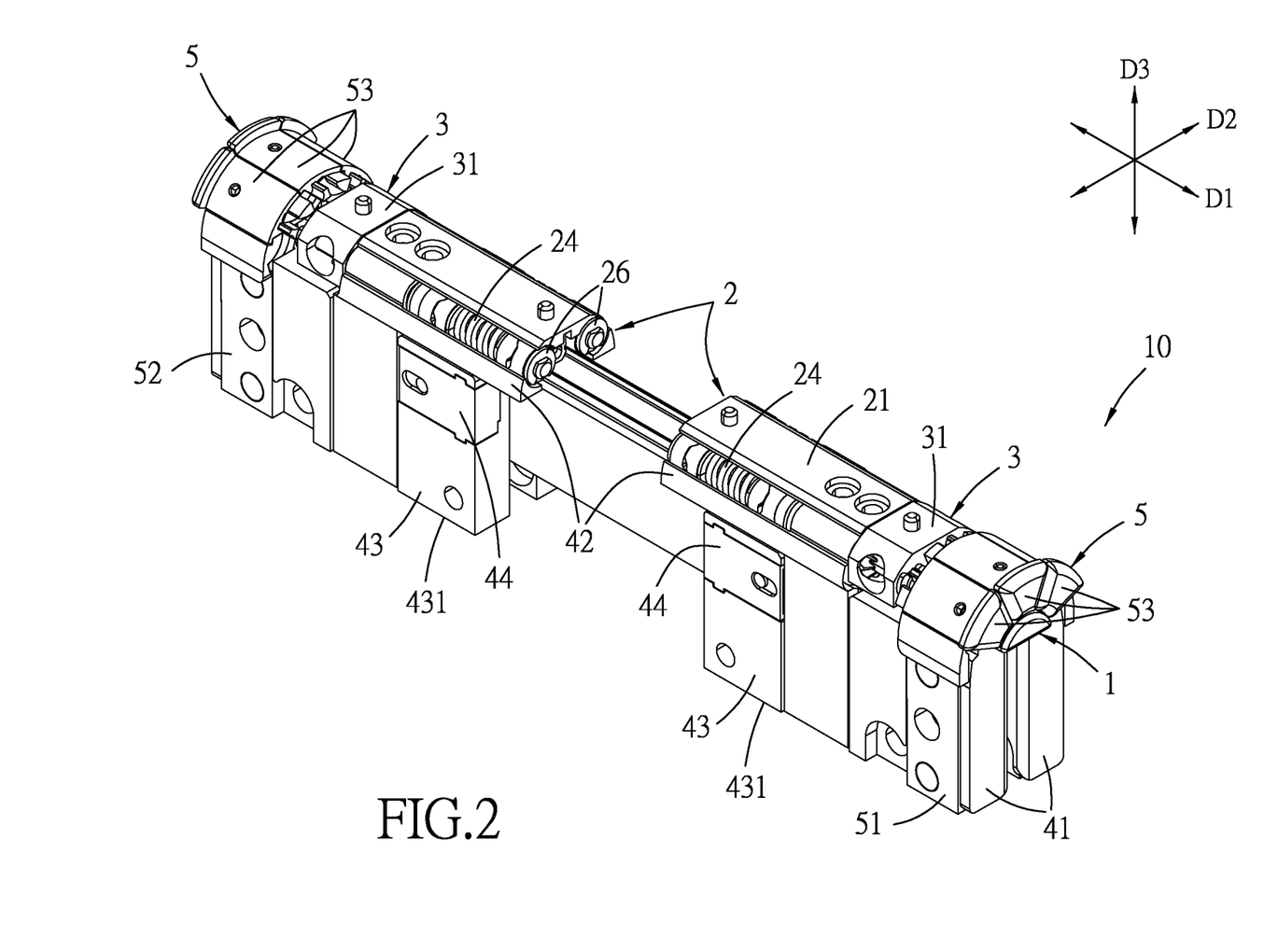
FIG. 2 is a perspective view of the embodiment in an outfolded state.
Figure 3:
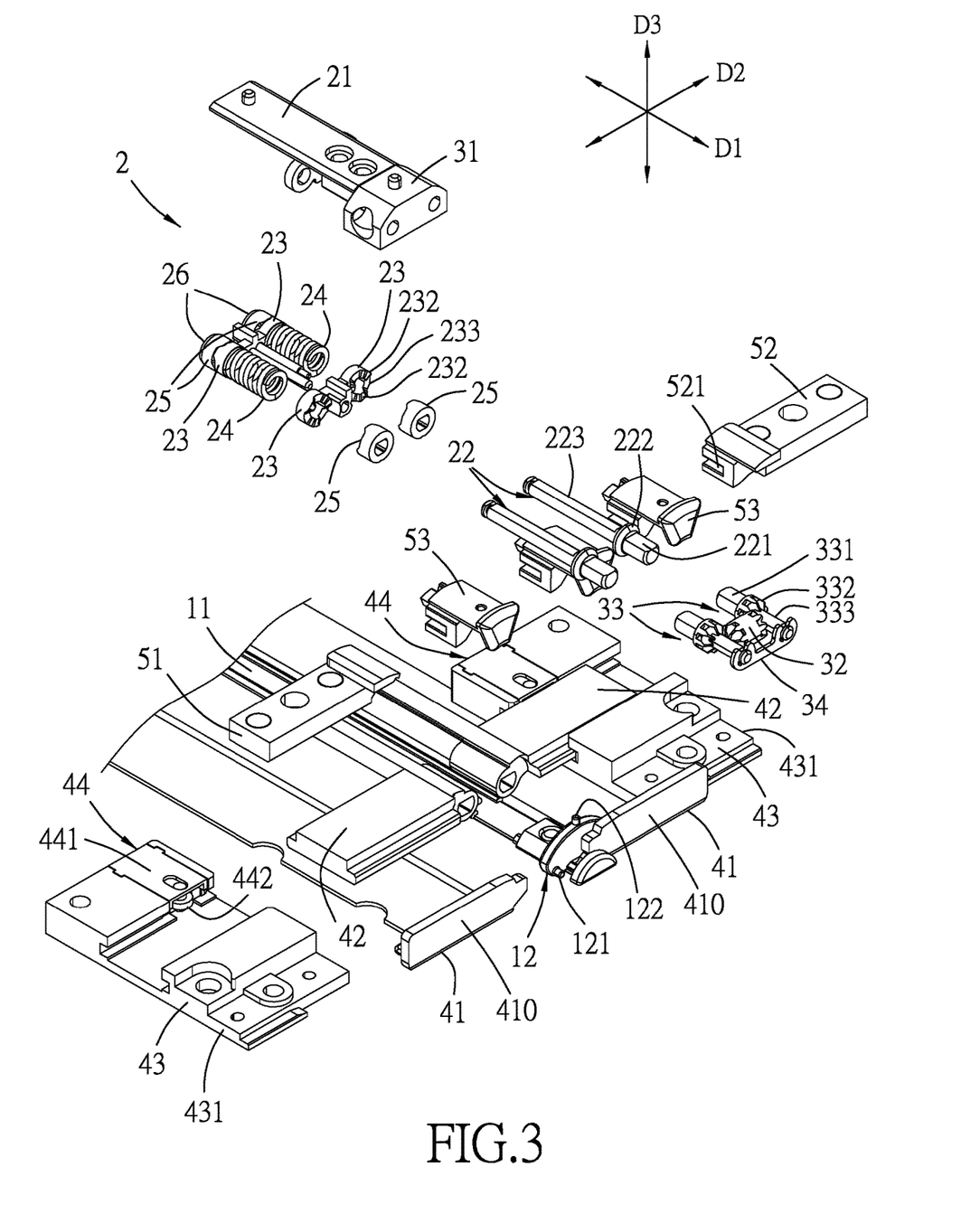
FIG. 3 is a fragmentary, exploded perspective view of the embodiment.

Referring to FIGS. 1 to 3, an embodiment of a hinge 10 according to the disclosure is adapted to be mounted on two device parts (not shown) of a foldable electronic device (not shown) for supporting a flexible display (not shown). In this embodiment, the flexible display is securely mounted on upper surfaces of the two device parts, and the hinge 10 is for supporting the flexible display and is not for securely attaching the flexible display. The hinge 10 of this embodiment includes a base frame unit 1, two rotatable axle units 2, two synchronizing units 3, two movable bracket units 4 and two guiding bracket units 5.

The base frame unit 1 includes a long-plate shaped base seat 11 which is elongated in a front-rear direction (D1), and two end positioning members 12 which are disposed on and extend uprightly from front and rear ends of the base seat 11, respectively. Each end positioning member 12 has an upper post 122 projecting upwardly, and two guide keys 121 extending in the front-rear direction (D1) and away from the rotatable axle units 2, which are described in detail hereinafter.

Figure 4:
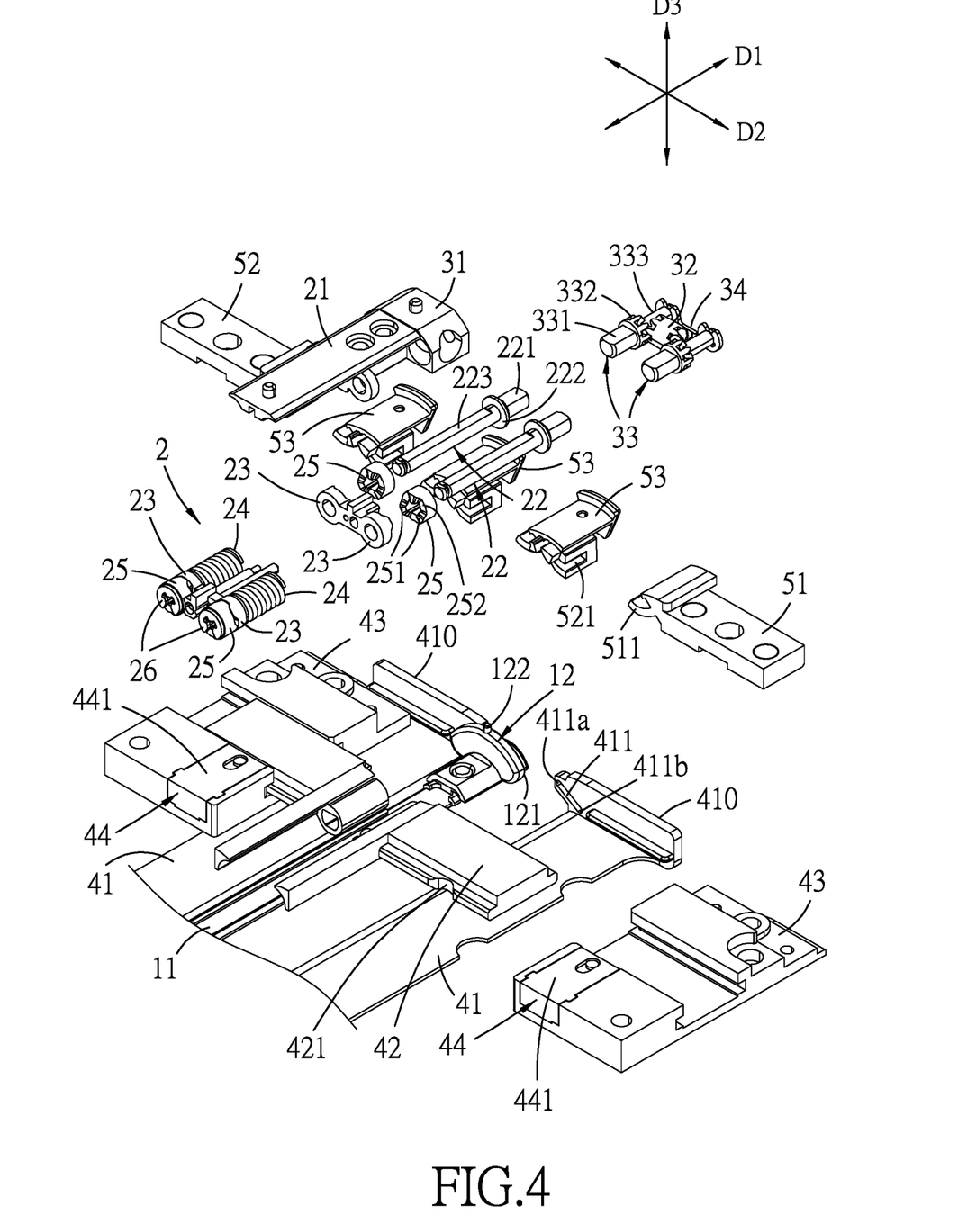
FIG. 4 is a fragmentary, exploded perspective view of the embodiment, taken from another angle.

With reference to FIGS. 1, 3 and 4, the rotatable axle units 2 are disposed on the base seat 11 and are spaced apart from each other in the front-rear direction (D1). Each rotatable axle unit 2 includes a receiving seat 21 which is disposed on the base seat 11, two hinge shafts 22 which are spaced apart from each other in a left-right direction (D2) that is transverse to the front-rear direction (D1) and each of which is rotatably disposed to the receiving seat 21 about a shaft axis parallel to the front-rear direction (D1), two pairs of retaining rings 23 which are spaced apart from each other in the front-rear direction (D1) and each pair of which are sleeved around the corresponding hinge shaft 22 to permit a rotation of the hinge shaft 22 relative thereto, two pairs of retained members 25, each pair of which are non-rotatably sleeved on the corresponding hinge shaft 22 and which respectively face the retaining rings 23 in the front-rear direction (D1), two washers 26 each of which is sleeved on the corresponding hinge shaft 22 to abut against one of the retained members 25, and two biasing members 24 each of which is interposed between the retaining rings 23 of each pair to bias the retaining rings 23 toward the retained members 25. Two retaining rings 23 of the pairs are integrally formed with each other, and other retaining rings 23 of the pairs are integrally formed with each other. Each hinge shaft 22 extends along its shaft axis to have a first extending section 221 which extends through the corresponding movable bracket unit 4, a second extending section 223 on which the retaining rings 23, the biasing member 24 and the retained members 25 are sleeved, and a disc section 222 which is interposed between the first and second extending sections 221, 223 and which extends radially and outwardly for abutment of the corresponding movable bracket unit 4 thereagainst. Each retaining ring 23 has a plurality of first protuberances 232 which are angularly spaced apart from each other about the shaft axis by a plurality of first indentations 233. Each retained member 25 has a plurality of second protuberances 251 which are angularly spaced apart from each other about the shaft axis by a plurality of second indentations 252 such that the retained members 25 are rotatable along with the rotations of the hinge shafts 22 between a first state, where the second protuberances 251 are respectively engaged in the first indentations 233, and the first protuberances 232 are respectively engaged in the second indentations 252, and a second state, where the second protuberances 251 are respectively engaged with the first protuberances 232 and the retaining rings 23 are moved away from the corresponding retained members 25 to compress the biasing members 24. Thus, the frictional force is provided during the rotations of the hinge shafts 22 and the movable bracket units 4 relative to the base frame unit 1. The washers 26 can prevent deflection of the hinge shafts 22 from the front-rear direction (D1).

Figure 5:
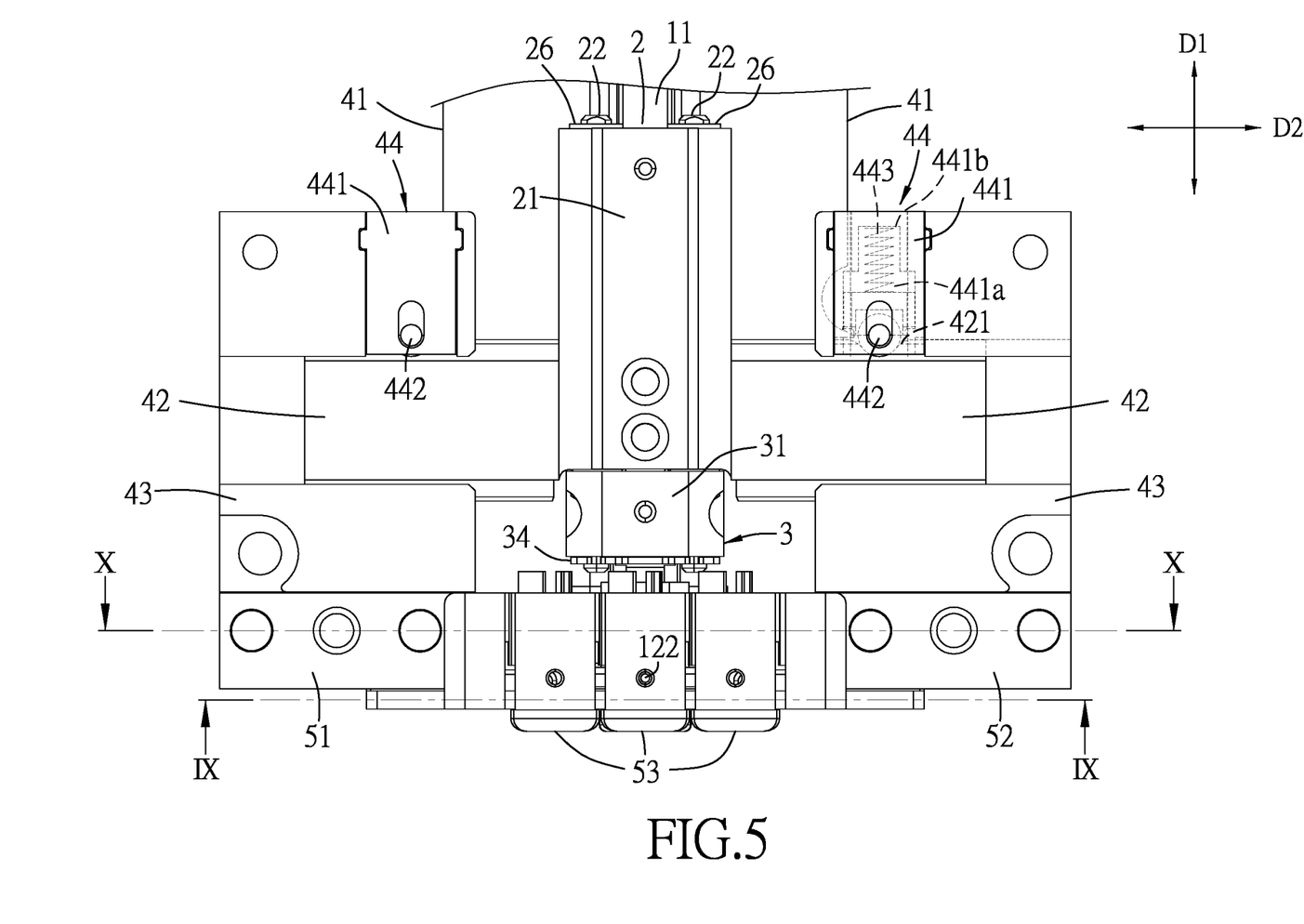
FIG. 5 is a fragmentary top view of the embodiment.

With reference to FIGS. 3 to 5, the synchronizing units 3 are respectively disposed to the rotatable axle units 2 to make synchronous rotations of the hinge shafts 22 in opposite rotational directions. Each synchronizing unit 3 includes a synchronizing seat 31 which is disposed on the base seat 11, a first gear member 32 which is rotatably mounted to the synchronizing seat 31 about a gear axis parallel to the left-right direction (D2) and which extends in the left-right direction to have two end surfaces that are in the form of bevel gears, and two second gear members 33 each of which has a bevel gear portion 332 that meshes with a respective one of the end surfaces of the first gear member 32, a first axial portion 331 that extends from the bevel gear portion 332 along the corresponding shaft axis, and a second axial portion 333 that extends from the bevel gear portion 332 and away from the first axial portion 331 along the corresponding shaft axis. Each synchronizing unit 3 further includes a washer 34 securely sleeved on the second axial portions 333 and abutting against the synchronizing seat 31 so as to prevent deflection of the second gear members 33 from the front-rear direction (D1). A rotation of one second gear member 33 results in a rotation of the first gear member 32 about an intersect axis and brings the other second gear member 33 into a rotation about an axis parallel to that of the one second gear member 33. With such meshing of the bevel gears, the space required to receive the first and second gear members 32, 33 is reduced as compared with those having spur gears, thereby reducing the volume of the synchronizing units 3.

With reference to FIGS. 3 to 5, the movable bracket units 4 are pivotably disposed to the base seat 11 and opposite to each other in the left-right direction (D2). Each movable bracket unit 4 includes a base plate 41 which is turnably disposed to the base frame unit 1 for the corresponding device part (not shown) to be securely mounted and which is elongated in the front-rear direction (D1), two rotary blocks 42 which are respectively and non-rotatably sleeved on the first extending sections 221 of the hinge shafts 22 to abut against the disc sections 222 and which are respectively and non-rotatably sleeved on the first axial portions 331 of the second gear members 33, two movable plates 43 which are connected with and movable relative to the rotary blocks 42, respectively, to be securely connected with the corresponding device part (not shown) and each of which has a distal end 431 remote from the respective hinge shaft 22, and two locking mechanisms 44 which are respectively disposed on the movable plates 43 and adjacent to the rotary blocks 42. The base plates 41 are turnable with the rotations of the hinge shafts 22. The base plate 41 of each movable bracket unit 4 has two upright end plates 410 which are disposed adjacent to and face the end positioning members 12, respectively. Each upright end plate 410 has a guideway 411 which is formed and configured for a respective one of the guide keys 121 to be slidably engaged therein. The guideway 411 has first and second closed ends (411a, 411b). With the non-rotatable connection of the rotary blocks 42 with the hinge shafts 22 and the second gear members 33, rotations of the hinge shafts 22 at one side (a left side or a right side) of the base seat 11 result in rotations of the rotary blocks 42 and the second gear members 33 at the one side of the base seat 11, and bring in rotations of the second gear members 33, the rotary blocks 42 and the hinge shafts 22 at the other side of the base seat 11 so as to make the synchronous rotations of the hinge shafts 22 in opposite rotational directions. Each rotary block 42 has a locking recess 421 which is formed in an end edge thereof. Each locking mechanism 44 has a housing 441 which defines a receiving groove (441a) that extends in a locking direction to terminate at an inner end (441b) (as shown in FIG. 5), a peg 442 which is movably disposed in the receiving groove (441a) in the locking direction, and a locking spring 443 which abuts against the inner end (441b) and the peg 442. The locking mechanism 44 is movable along with the movement of the movable plate 43 relative to the rotary block 42.

With reference to FIGS. 3 and 6 to 8, the guiding bracket units 5 are respectively disposed on front and rear ends of the base seat 11. Each guiding bracket unit 5 includes a male arm 51 which is securely connected with one of the movable plates 43 of one of the movable bracket units 4, a female arm 52 which is securely connected with one of the movable plates 43 of the other one of the movable bracket units 4 and opposite to the male arm 51 in the left-right direction (D2), and three guiding connecting members 53 which are interposed between the male arm 51 and the female arm 52 and which are adjoined with each other in the left-right direction (D2). Each guiding connecting member 53 has a body 531 which extends in the left-right direction (D2) to have first and second end surfaces (531a, 531b) and which has a sliding groove (531d) that extends from the second end surface (531b) toward the first end surface (531a), a protrusion 532 which extends outwardly from the first end surface (531a) and which is movably engaged in the sliding groove (531d) of an adjacent one of the guiding connecting members 53, an upper cover plate 533 which is connected with an upper of the body 531, and an outer cover plate 534 which is connected with an outer end of the upper cover plate 533 and which is spaced apart from the body 531 in the front-rear direction (D1). The body 531 further has an inner side surface (531c) which interconnects the first and second end surfaces (531a, 531b) and is opposite to the outer cover plate 534 in the front-rear direction (D1), and an abutted block (531e) which is formed in the sliding groove (531d) and distal from the inner side surface (531c) and which is flush with the second end surface (531b). The sliding groove (531d) is recessed from the second end surface (531b) and the inner side surface (531c). The protrusion 532 has an abutting portion (532a) which faces the abutted block (531e) of an adjacent one of the guiding connecting members 53. The upper cover plate 533 of a middle guiding connecting member 53 has an engaging hole (533a) for engaging with the upper post 122 of the corresponding end positioning member 12 so as to secure the middle guiding connecting member 53 to the end positioning member 12. The outer cover plate 534 has a width which spans in the left-right direction (D2) and which is gradually decreased in an up-down direction (D3) that is transverse to both the front-rear direction (D1) and the left-right direction (D2). The male arm 51 has a fitting protrusion 511 which extends toward the guiding connecting members 53 and which is configured to be movably engaged in the sliding groove (531d) of an adjacent one of the guiding connecting members 53. The female arm 52 has a fitting sliding groove 521 which is formed for the protrusion 532 of an adjacent one of the guiding connecting members 53 to be movably engaged therein. In this embodiment, each of the fitting protrusion 511 and the protrusions 532 extends arcuately, and each of the fitting sliding groove 521 and the sliding grooves (531d) extends arcuately for fitting to a corresponding one of the fitting protrusions 511 and the protrusions 532. The number of the guiding connecting members 53 may be varied and is odd.

Figure 6:
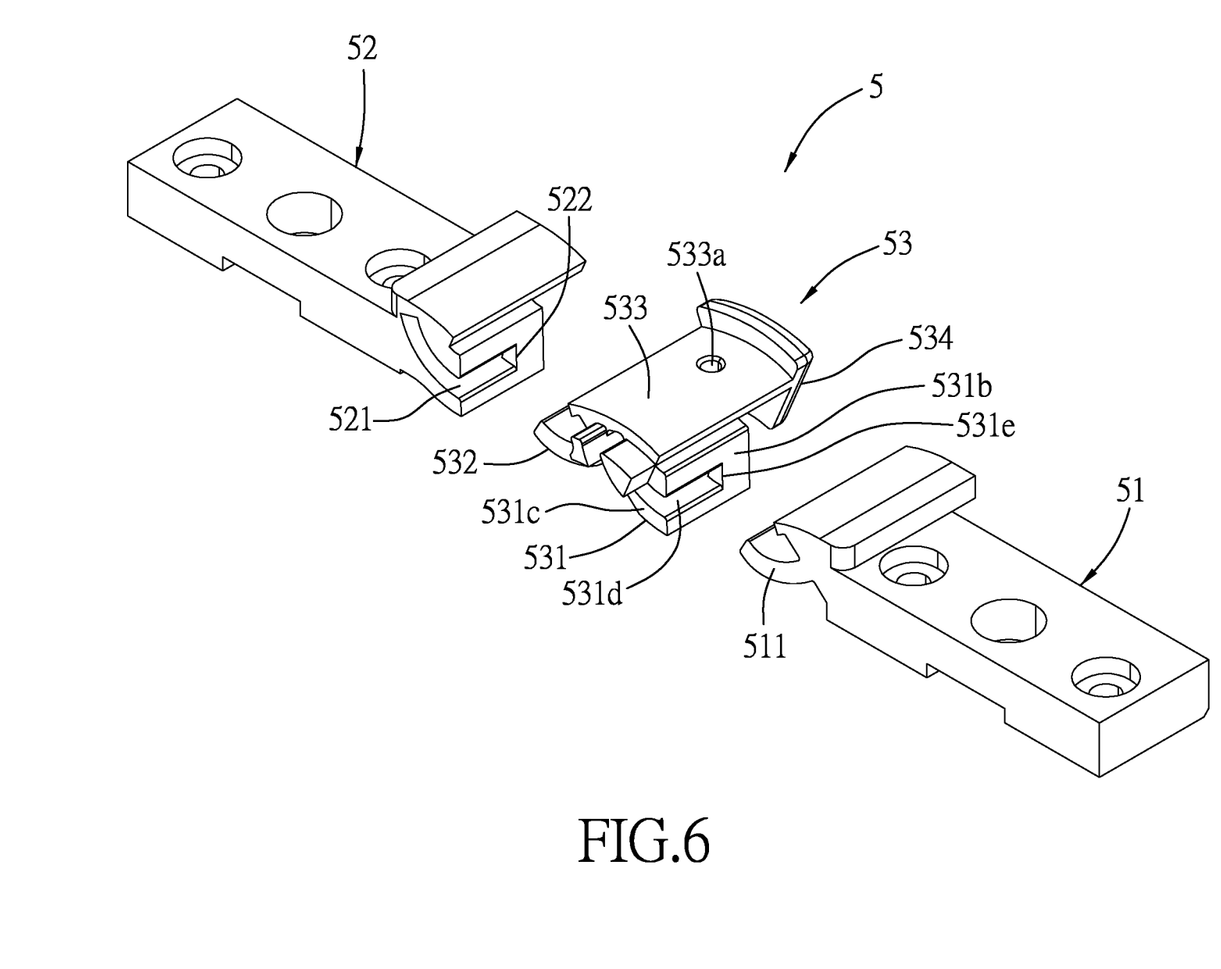
FIG. 6 is a fragmentary, exploded perspective view of a guiding bracket unit of the embodiment, two guiding connecting members thereof being removed.
Figure 7:
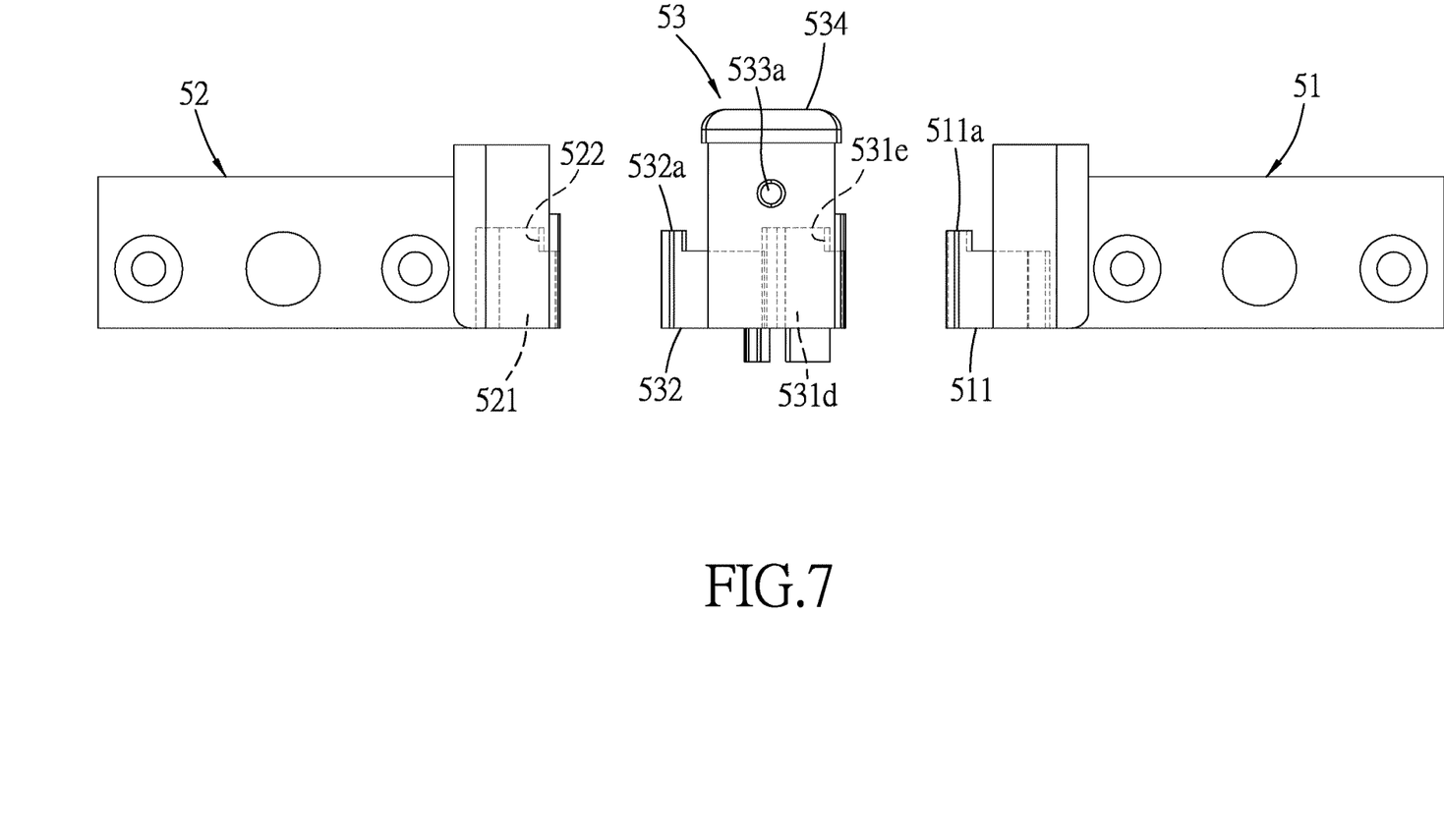
FIG. 7 is a schematic top view of FIG. 6.
Figure 8:
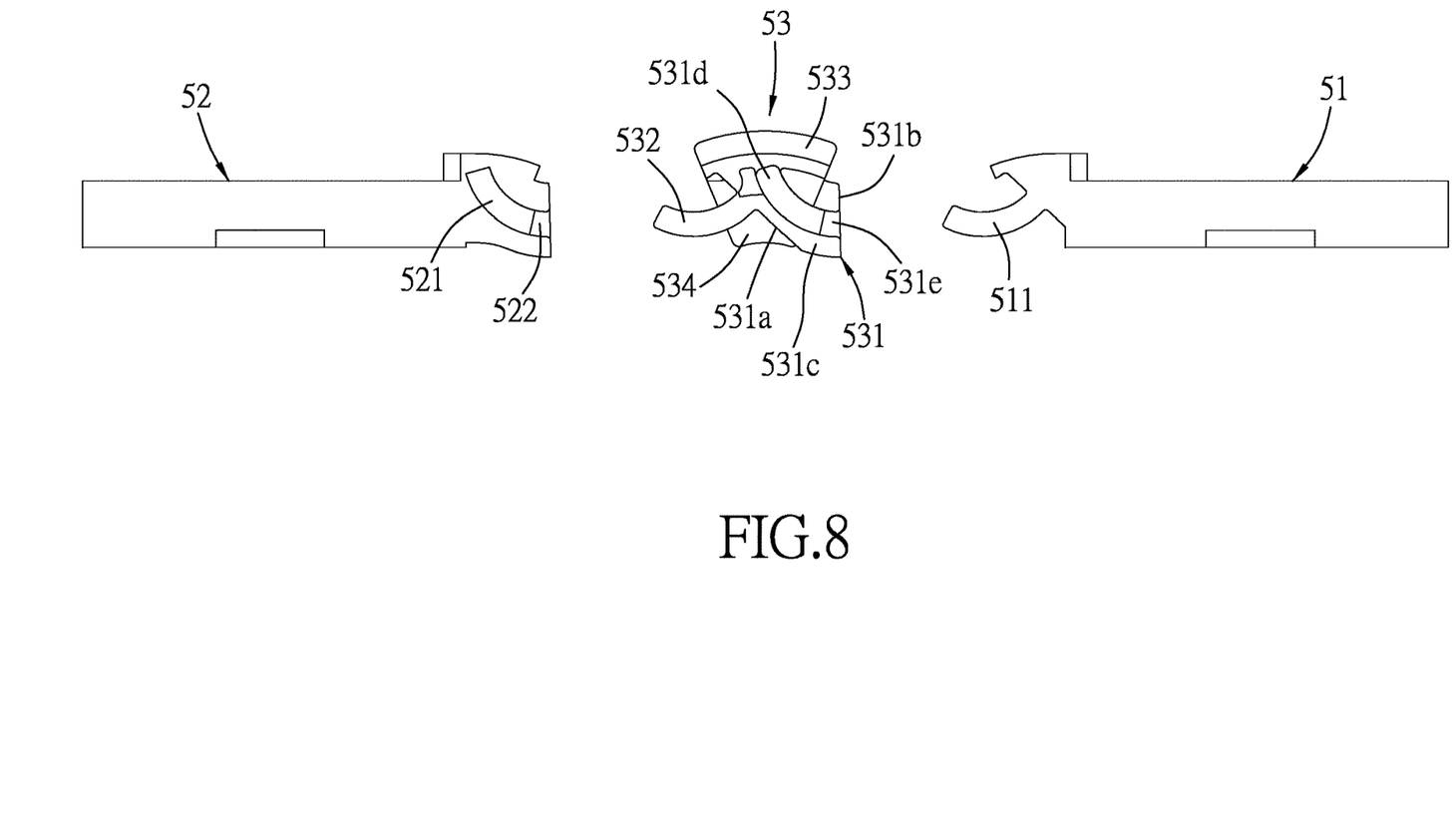
FIG. 8 is a schematic rear view of FIG. 6.
Figure 9:
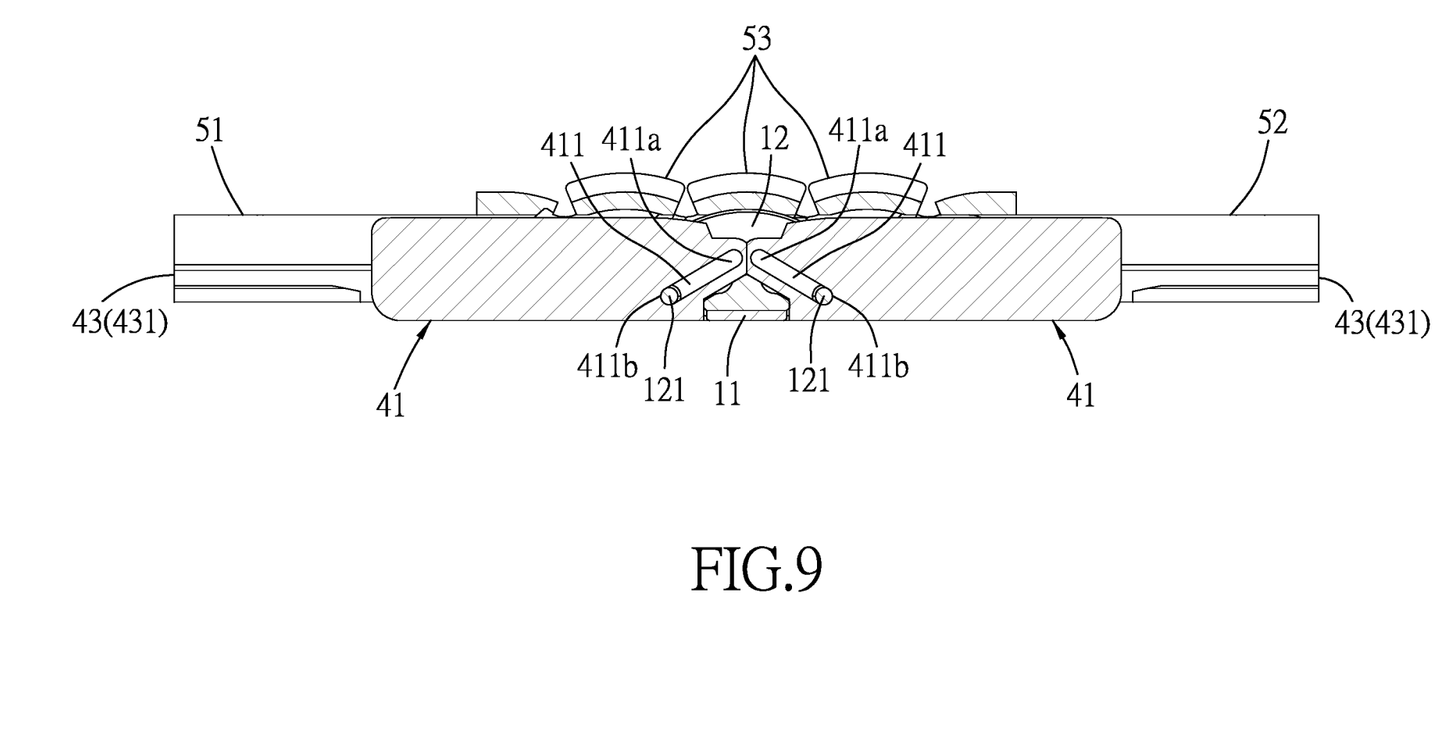
FIG. 9 is a sectional view taken along line IX-IX of FIG. 5, illustrating the guiding connecting members being in a second position.
Figure 10:
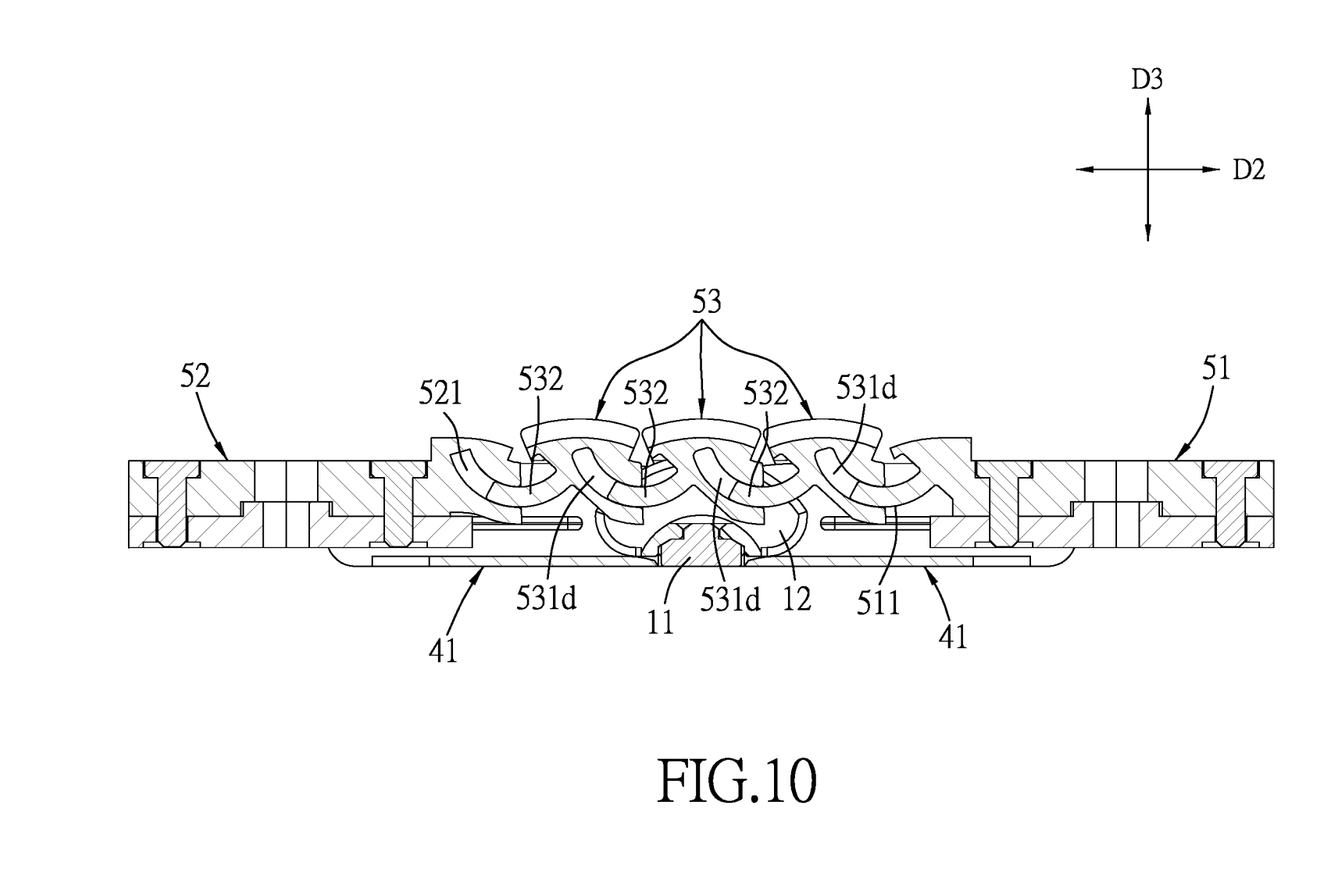
FIG. 10 is a sectional view taken along line X-X of FIG. 5, illustrating the guiding connecting members being in the second position.
Figure 11:
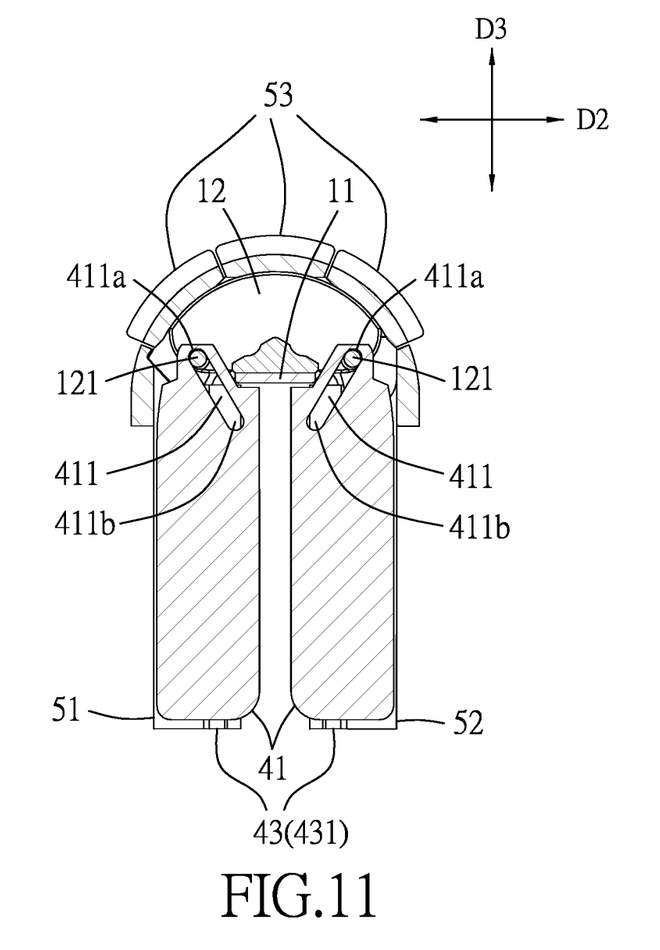
FIG. 11 is a sectional view similar to FIG. 9, but illustrating the guiding connecting members being in a first position.
Figure 12:
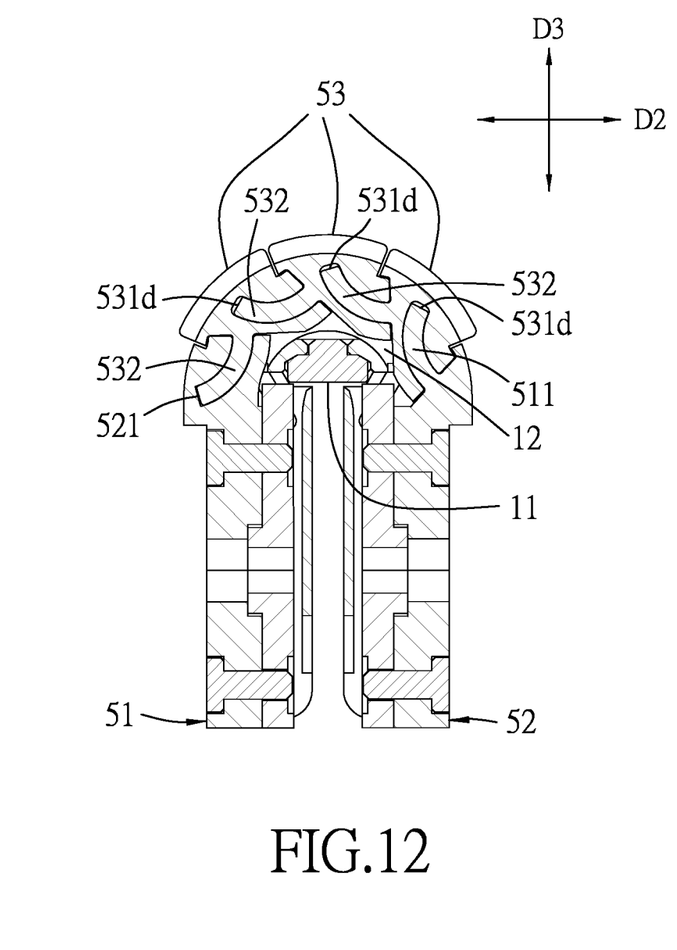
FIG. 12 is a sectional view similar to FIG. 10, but illustrating the guiding connecting members being in the first position.

With reference to FIGS. 1, 2, and 9 to 12, the guiding connecting members 53 are angularly movable relative to the base seat 11 between a first position (see FIGS. 2, 11 and 12), where the protrusions 532 of the guiding connecting members 53 and the fitting protrusion 511 of the male arm 51 are fully engaged in the corresponding fitting sliding groove 521 and the sliding grooves (531d) so as to permit the guiding connecting members 53 to be close intimately to each other, and a second position (see FIGS. 1, 9 and 10), where the protrusions 532 of the guiding connecting members 53 and the fitting protrusion 511 of the male arm 51 are partly engaged in the corresponding fitting sliding groove 521 and the sliding grooves (531d) so as to permit the guiding connecting members 53 to be remote from each other. With reference to FIGS. 11 and 12, in the first position, the hinge 10 is correspondingly in an outfolded state, where the male and female arms 51, 52 extend in the up-down direction (D3) and the movable plates 43 extend also in the up-down direction (D3) and proximate to the corresponding hinge shafts 22 to have the distal ends 431 close to each other. In this state, the pegs 442 are misaligned with the locking recesses 421 and retreated in the receiving grooves (441a) so that the locking springs 443 are compressed, and the guide keys 121 are engaged in the first closed ends (411a) of the guideways 411 of the base plates 41. With reference to FIGS. 2, 9 and 10, in the second position, the hinge 10 is correspondingly in an unfolded state, where the male and female arms 51, 52 extend in the left-right direction (D2), and the movable plates 43 also extend in the left-right direction (D2) to have the distal ends 431 remote from each other, and are moved relative to the rotary blocks 42 to be distal from the corresponding hinge shafts 22. In this state, the abutting portion (532a) of each guiding connecting member 53 abuts against the abutted block (531e) of the adjacent guiding connecting member 53 to prevent removal of the protrusion 532 from the corresponding sliding groove (531d) (as shown in FIGS. 6 and 7). Additionally, the guide keys 121 are engaged in the second closed ends (411b) of the guideways 411 of the base plates 41, and the pegs 442 are inserted into the locking recesses 421 by means of the biasing action of the locking springs 443 so as to provide a locking feel to the user (as shown in FIG. 5). Thus, the unfolded state of the hinge 10 can be kept to be convenient for the user to use and operate the flexible display (not shown). With the arcuate fitting protrusion 511 of the male arm 51 and the protrusions 532 of the guiding connecting members 53, and the arcuate and corresponding fitting sliding groove 521 of the female arm 52 and the sliding grooves (531d) of the guiding connecting members 53, the hinge 10 is made more compact and the distance between two adjacent ones of the guiding connecting members 53 is increased when the guiding connecting members 53 are in the second position.

As illustrated, during the angular movement of the guiding connecting members 53 between the first position and the second position, removal of the protrusions 532 from the corresponding sliding grooves (531d) is prevented by means of abutting engagement of the abutting portions (532a) of the protrusions 532 against the abutted blocks (531e) in the sliding grooves (531d). Also the male arm 51 and the female arm 52 are securely connected with the movable plates 43 so as to prevent excess movement of the movable plates 43 away from the hinge shafts 22 and removal of the movable plates 43 from the rotary blocks 42.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge comprising:
a base frame unit including a base seat which is elongated in a front-rear direction;
two rotatable axle units disposed on said base seat and spaced apart from each other in the front-rear direction, each of said rotatable axle units including a receiving seat which is disposed on said base seat, and two hinge shafts which are spaced apart from each other in a left-right direction that is transverse to the front-rear direction and each of which is rotatably disposed to said receiving seat about a shaft axis parallel to the front-rear direction;
two synchronizing units respectively disposed to said rotatable axle units to make synchronous rotations of said hinge shafts in opposite rotational directions;
two movable bracket units pivotably disposed to said base seat and opposite to each other in the left-right direction, each of said movable bracket units including a base plate which is turnably disposed to said base frame unit and which is elongated in the front-rear direction, two rotary blocks which are non-rotatably sleeved on said hinge shafts, respectively, and two movable plates which are connected with and movable relative to said rotary blocks, respectively, and each of which has a distal end remote from said respective hinge shaft; and
two guiding bracket units respectively disposed on front and rear ends of said base seat, each of said guiding bracket units including a male arm which is securely connected with one of said movable plates of one of said movable bracket units, a female arm which is securely connected with one of said movable plates of the other one of said movable bracket units and opposite to said male arm in the left-right direction, and a plurality of guiding connecting members which are interposed between said male arm and said female arm and which are adjoined with each other in the left-right direction, each of said guiding connecting members having a body which extends in the left-right direction to have first and second end surfaces and which has a sliding groove that extends from said second end surface toward said first end surface, and a protrusion which extends outwardly from said first end surface and which is movably engaged in said sliding groove of an adjacent one of said guiding connecting members such that each of said guiding connecting members is angularly movable relative to said base seat between a first position, where said protrusion is fully engaged in said corresponding sliding groove so as to permit said guiding connecting members to be close intimately to each other, said male and female arms extend in an up-down direction that is transverse to both the front-rear direction and the left-right direction, and said movable plates extend also in the up-down direction and proximate to said corresponding hinge shafts to have the distal ends close to each other, and a second position, where said protrusion is partly engaged in said corresponding sliding groove so as to permit said guiding connecting members to be remote from each other, said male and female arms extend in the left-right direction, and said movable plates also extend in the left-right direction to have said distal ends remote from each other, and are moved relative to said rotary blocks to be distal from said corresponding hinge shafts, said body of each of said guiding connecting members having an abutted block which is formed in said sliding groove, said protrusion having an abutting portion which faces and abuts against said abutted block of said adjacent guiding connecting member in the second position to prevent removal of said protrusion from said sliding groove.

2. The hinge as claimed in claim 1, wherein said body of each of said guiding connecting members has an inner side surface which interconnects said first and second end surfaces, said sliding groove being recessed from said second end surface and said inner side surface, said abutted block being distal from said inner side surface and being flush with said second end surface.

3. The hinge as claimed in claim 2, wherein each of said guiding connecting members further has an upper cover plate which is connected with an upper of said body, and an outer cover plate which is connected with an outer end of said upper cover plate and opposite to said inner side surface and which is spaced apart from said body in the front-rear direction, said outer cover plate having a width which spans in the left-right direction and which is gradually decreased in the up-down direction.

4. The hinge as claimed in claim 2, wherein said male arm of each of said guiding bracket units has a fitting protrusion which extends toward said guiding connecting members and which is configured to be movably engaged in said sliding groove of an adjacent one of said guiding connecting members, said female arm of each of said guiding bracket units having a fitting sliding groove which is formed for said fitting protrusion of an adjacent one of said guiding connecting members to be movably engaged therein.

5. The hinge as claimed in claim 4, wherein each of said fitting protrusion and said protrusions extends arcuately, and each of said fitting sliding groove and said sliding grooves extends arcuately for fitting to a corresponding one of said fitting protrusion and said protrusions.

6. The hinge as claimed in claim 1, wherein said base frame unit further includes two end positioning members which are disposed on and extend uprightly from said front and rear ends of said base seat, respectively, each of said end positioning members being securely connected with one of said guiding connecting members of a respective one of said guiding bracket units, and having two guide keys which extend in the front-rear direction and away from said rotatable axle units, said base plate of each of said movable bracket units having two upright end plates which are disposed adjacent to and face said end positioning members, respectively, each of said upright end plates having a guideway which is formed and configured for a respective one of said guide keys to be slidably engaged therein, said guideway having first and second closed ends such that said base plates are turnable relative to said base seat with the rotations of said hinge shafts and angular movement of said guiding connecting members, and such that, when said guiding connecting members are in the first position, each of said guide keys is engaged in said first closed end, and during the angular movement of said guiding connecting members from the first position to the second position, said base plates are turned relative to said base seat and said guide keys are moved to be respectively engaged in said second closed ends.

7. The hinge as claimed in claim 1, wherein each of said synchronizing units includes a synchronizing seat which is disposed on said base seat, a first gear member which is rotatably mounted to said synchronizing seat about a gear axis parallel to the left-right direction and which extends in the left-right direction to have two end surfaces that are in form of bevel gears, and two second gear members each of which has a bevel gear portion that meshes with a respective one of said end surfaces of said first gear member, and a first axial portion that extends from said bevel gear portion along the shaft axis and that is non-rotatably fitted to a respective one of said rotary blocks such that rotations of said hinge shafts at one side of said base seat result in rotations of said rotary blocks and said second gear members at said one side of said base seat, and bring in rotations of said second gear members, said rotary blocks and said hinge shafts at the other side of said base seat so as to make the synchronous rotations of said hinge shafts in opposite rotational directions.

8. The hinge as claimed in claim 1, wherein each of said rotatable axle units further includes two pairs of retaining rings which are spaced apart from each other in the front-rear direction and each pair of which are sleeved around a respective one of said hinge shafts to permit rotations of said hinge shafts relative thereto, two pairs of retained members, each pair of which are non-rotatably sleeved on the respective one of said hinge shafts and which respectively face said retaining rings in the front-rear direction, and two biasing members each of which is interposed between said retaining rings of each pair to bias said retaining rings toward said retained members, each of said retaining rings having a plurality of first protuberances which are angularly spaced apart from each other by a plurality of first indentations, each of said retained members having a plurality of second protuberances which are angularly spaced apart from each other by a plurality of second indentations such that said retained members are rotatable along with the rotations of said hinge shafts between a first state, where said second protuberances are respectively engaged in said first indentations, and said first protuberances are respectively engaged in said second indentations, and a second state, where said second protuberances are respectively engaged with said first protuberances and said retaining rings are moved away from said corresponding retained members to compress said biasing members.

9. The hinge as claimed in claim 8, wherein each of said hinge shafts extends along the shaft axis to have a first extending section on which said corresponding rotary block is non-rotatably sleeved, a second extending section on which said retaining rings, said biasing member and said retained members are sleeved, and a disc section which is interposed between said first and second extending sections and which extends radially and outwardly for abutment of said corresponding rotary block thereagainst.

10. The hinge as claimed in claim 1, wherein each of said rotary blocks has a locking recess which is formed in an end edge thereof, each of said movable bracket units further including two locking mechanisms which are respectively disposed on said movable plates and adjacent to said rotary blocks, each of said locking mechanisms having a housing which defines a receiving groove that extends in a locking direction to terminate at an inner end, a peg which is movably disposed in said receiving groove in the locking direction, and a locking spring which abuts against said inner end and said peg such that said locking mechanisms are movable along with movement of said movable plates relative to said rotary blocks, and such that, when said guiding connecting members are in the first position, said peg is misaligned with said locking recess and retreated in said receiving groove, and when said guiding connecting members are in the second position, said peg is biased by said locking spring and inserted into said locking recess.

* * * * *